Oct. 22, 1968   J. J. SADOWSKI   3,406,568

FILM INSPECTION MACHINE

Filed April 19, 1966   2 Sheets-Sheet 1

INVENTOR.
JOHN J. SADOWSKI

BY *Whittemore,*
*Hulbert & Belknap*

ATTORNEYS

Oct. 22, 1968 J. J. SADOWSKI 3,406,568
FILM INSPECTION MACHINE
Filed April 19, 1966 2 Sheets-Sheet 2

INVENTOR.
JOHN J. SADOWSKI
BY Whittemore,
Hulbert & Belknap
ATTORNEYS

United States Patent Office 3,406,568
Patented Oct. 22, 1968

3,406,568
FILM INSPECTION MACHINE
John J. Sadowski, 5788 Kenmoor Road,
Birmingham, Mich. 48010
Filed Apr. 19, 1966, Ser. No. 543,665
11 Claims. (Cl. 73—159)

ABSTRACT OF THE DISCLOSURE

The structure of this invention comprises means for moving a movie film or the like past a fault sensing structure. When a fault is sensed in the film, means are provided for automatically stopping the movement of the film and for automatically moving the film and fault sensing structure out of contact with each other.

---

The invention relates to inspection arts and refers more specifically to structure for and a method of inspecting motion picture film and the like.

The use of moving picture film, film strips and the like in educational institutions, industry and by the general public through libraries and the like has increased markedly in recent years. Each film after use should be inspected for faults, such as tears in the sprocket and sound track sides thereof, burns, scratches, splices and sprocket punches and the like to insure proper preventive maintenance with regard to the film, whereby the film is always ready for rerunning and damage not multiplied.

Film inspection in the past has been a tedious, time consuming job, particularly where the film is inspected manually. Prior known automatic apparatus for inspecting film has been complicated, expensive and often inefficient.

It is therefore one of the objects of the present invention to provide improved structure for inspection of movie film or the like.

Another object is to provide apparatus for the inspection of movie film or the like comprising means for moving the film linearly over fault sensing structure and means responsive to the fault sensing structure for stopping the linear movement of the film in response to sensing of a fault in the film.

Another object is to provide apparatus as set forth above and further including means for relatively moving the fault sensing structure and film into and out of engagement in a controlled manner.

Another object is to provide an improved method of film inspection.

Another object is to provide a method of film inspection including moving the film linearly beneath fault sensing structure which produces an electric signal on finding of a fault in the film and stopping the film in response to the electric signal.

Another object is to provide apparatus for and a method of film inspection which is simple, economical and efficient.

Other objects and features of the invention will become apparent as the description proceeds, especially when taken in conjunction with the accompanying drawings, illustrating a preferred embodiment of the invention, wherein.

With particular reference to the figures of the drawings, one embodiment of the present invention will now be considered in detail.

Figure 1:
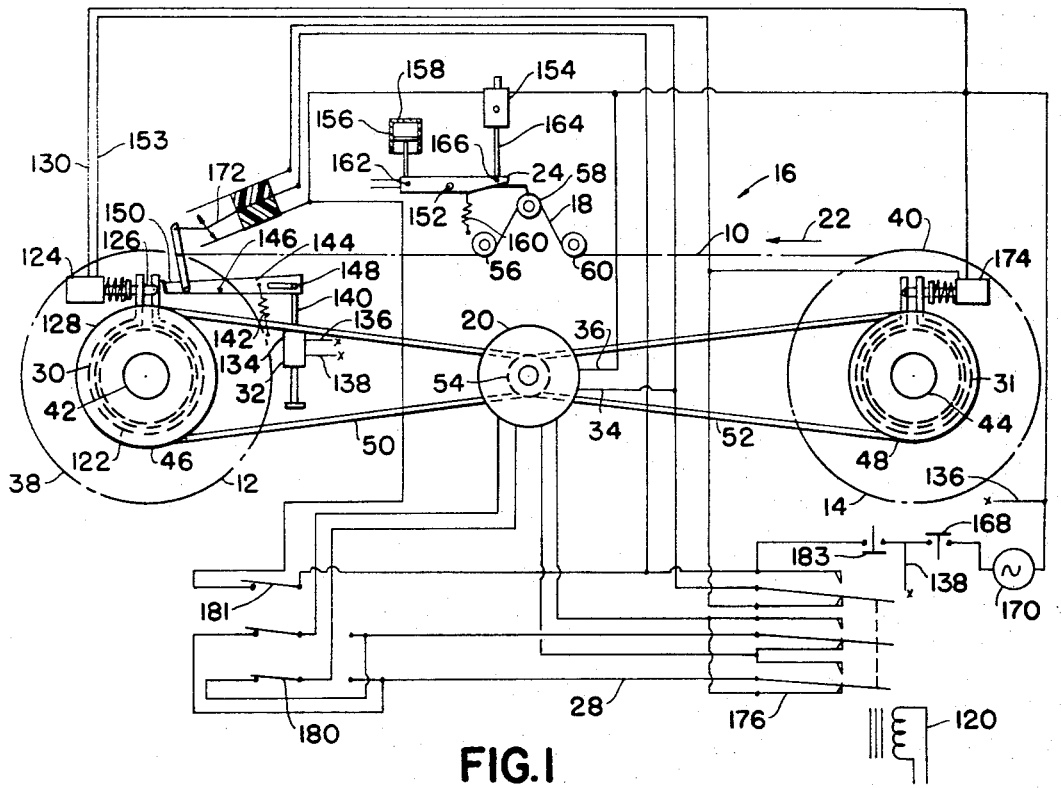
FIGURE 1 is a partly diagrammatic and partly schematic representation of the apparatus for inspection of film constructed in accordance with the invention.

As shown in FIGURE 1, a movie film 10 is positioned on the reel structures 12 and 14 of the film inspection apparatus generally indicated 16, and is threaded through the film positioning structure 18. The motor 20 is actuated to drive the film 10 in, for example, the direction illustrated by arrow 22, to wind the film 10 on the reel 12 from the reel 14. The film 10 is contacted by the fault sensing structure 24 which is connected to the relay actuating circuit 26 and the control circuit 28 to actuate the brake structures 30 and 31 and the brake locking structure 32 on sensing of a fault in the film 10.

More specifically the motor 20 is a reversible electric motor energized through the electric leads 34 and 36. The motor 20 drives the reels 38 and 40 of the reel structures 12 and 14 through one-way clutch structures 42 and 44 and suitable pulleys 46 and 48 connected by means of belts 50 and 52 to the output pulley 54 driven by the motor 20. The one-way clutch structure allows reverse driving of the film 10 on reversing of the motor 20 with sufficient drag on the film to prevent free running of the reel which is not driving in the direction the film is being moved.

As shown in FIGURE 1, the structure 18 for positioning the film 10 adjacent the fault sensing structure 24 comprises three stationary rollers 56, 58 and 60. When the film 10 is threaded through the rollers 56, 58 and 60, as shown, a uniformly flat portion of the film is in engagement with the fault sensing structure 24 at any time the fault sensing structure is in a down or film engaging position.

Figure 2:
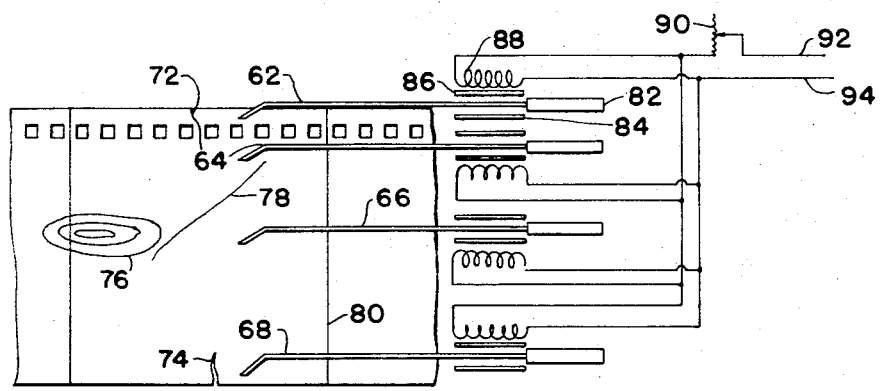
FIGURE 2 is a partially diagrammatic, partially schematic representation of the fault sensing structure of the invention.
Figure 3:
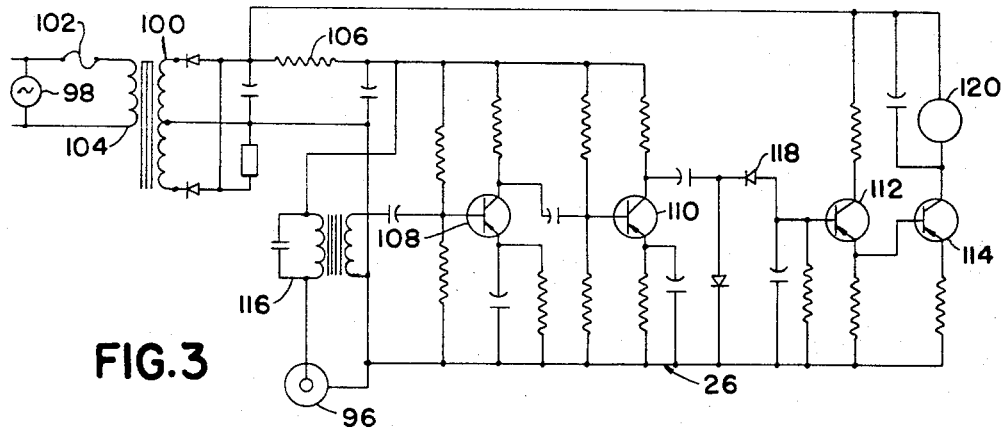
FIGURE 3 is a schematic diagram of the relay actuating circuit of the film inspection apparatus illustrated in FIGURE 1.

The fault sensing structure 24, as shown in more detail in FIGURE 2, includes four separate sensing fingers in the nature of resonant reeds or tuning forks 62, 64, 66 and 68. The sensing fingers, as shown, are positioned transversely of the film 10 and are operable to sense faults in the film. Thus, the sensing finger 62 will sense tears 72 in the sprocket side of the film, while the sensing finger 68 will sense tears 74 in the sound track side of the film. The sensing fingers 66 will detect burns 76 in the film which, if caused by the projector, will appear centrally thereof. Each of the fingers 62, 64, 66 and 68 will sense scratches 78 and splices 80 in the film.

Fingers 62, 66 and 68 are positioned to be in contact with the film 10 during operation, while finger 64 which is positioned to detect sprocket punches in the film 10 is raised slightly from the film so that it is slightly out of contact with the film when the other sensing fingers are in contact therewith. Finger 64 will thus detect sprocket punches and similar raised defects in the film 10 but will not detect scratches and the like.

Each of the sensing fingers 62, 64, 66 and 68 is connected to structure for providing an electric signal to the relay actuating circuit 26 on detection of a fault thereby. The structure for producing the electric signal is identical in conjunction with each of the sensing fingers. Therefore, only the structure connected to the sensing finger 62 will be considered in detail.

The sensing finger 62 is secured to the brass mounting member 82 for vibration at a predetermined frequency on sensing of a fault in the film 10. Beneath the sensing finger 62 a permanent magnet 84 is positioned, while a silicon steel member 86 is positioned above the sensing finger 62 and a coil 88 is positioned adjacent the silicon steel member 86.

In operation current is passed through the coil 88 when the relay actuating circuit 26 is energized so that on vibration of the sensing finger 62 an electric signal which varies at the frequency of vibration of the sensing finger 62 is generated. The magnitude of the signal generated as passed to the relay actuating circuit 26 is increased by the permanent magnet 84 and the silicon steel member 86. Desired sensitivity is controlled by the rheostat 90 in conductor 92, which together with the conductor 94 is connected to the input plug 96 of the relay actuating circuit 26.

Thus in operation, it will be seen, as the film moves beneath the sensing finger 62 in contact therewith on a fault such as a tear 72 in the sprocket side of the film 10 being felt by the finger 62, the finger will vibrate at a predetermined frequency, as for example five hundred cycles per second to produce a five hundred cycles per second signal from the coil 88. Each of the sensing fingers 62, 64, 66 and 68 if connected to a separate relay actuating circuit 26 may vibrate at a different frequency or, as shown in FIGURE 2, they may all be set to vibrate at the same frequency and to be connected in parallel to actuate a single relay actuating circuit 26.

If separate frequencies are provided for each of the sensing fingers 62, 64, 66 and 68, and separate relay actuating circuits 26 are provided in conjunction therewith, it would be possible to provide an indication of the location of the particular fault in the film whereby some indication of the probable type of fault will be given.

The relay actuating circuit 26 includes an alternating current power supply source 98 which supplies the full wave rectifier 100 through the fuse 102 and transformer 104. A filter circuit 106 is provided in conjunction with the rectifier 100 to provide a filtered direct current power supply to operate the oscillator 108, amplifier 110, emitter-follower 112, and power amplifier 114 of the relay actuating circuit 26. A tuned circuit 116 is provided which resonates at the frequency of the sensing finger 62 to supply actuating voltage to the oscillator circuit 108.

Thus, in operation, when the sensing finger 62 detects a fault in the film 10 and vibrates at a predetermined frequency, the coil 88 provides an electrical signal to the tuned circuit 116, causing oscillations therein which are passed to the oscillator 108, amplified by the amplifier 110, detected by the detector 118 and fed to the power amplifier 114 through the emitter-follower 112. The current in the power amplifier 114 then actuates the relay 120. Actuation of the relay 120 will cause the motor 20 to reverse and the brake structures 30 and 31 to be applied to stop the reel structures 12 and 14, will cause the locking structure 32 to actuate to stop the motor 20 and lock the brake structure 30 in a set position and will cause the fault sensing structure 24 to be pivoted so that the fingers are out of contact with the film 10.

The brake structure 30 is substantially the same as brake structure 31 and comprises the brake band 122 operable in conjunction with the reel 38 and pulley 46 to stop the rotation of the reel 38 when the brake solenoid 124 is actuated. The brake setting plunger 126 which is actuated by the solenoid 124 is held in a brake off position by spring 128 when the solenoid 124 is not actuated.

Brake locking structure 32 includes the solenoid 134 which may be energized over conductors 136 and 138 to move the plunger 140 in an up or brake release direction. The plunger 140 is urged in a downward or brake locking direction by a spring 142. The brake locking lever 144 is centrally pivotally mounted at 146 and is pivotally connected to the plunger 140 at 148. The opposite end 150 of the lever 144 is in an upper position as shown, adapted to engage the end of the brake band 122 in a position to hold the brake band 122 in a brake set position.

The fault sensing structure 24 is pivotally mounted at 152 for movement into an upper position out of contact with the film 10 passing over the roller 58. On deenergizing the solenoid 154, the fault sensing structure 24 is pivoted into its lower position by spring 160 at a controlled rate, depending on the escape of air from the dashpot 156 through air bleed 158. When solenoid 154 is energized the plunger 164 which is pivoted to the fault sensing structure at 166 is moved into an upper position to raise the fingers from the film.

The control circuit 28 will be considered in conjunction with the overall operation of the film inspection structure 16. When the start switch 168 is closed, with stop switch 183 closed alternating electric energy from the energy source 170 will pass through conductors 136 and 138 to the solenoid 134 which will cause the lever 144 to disengage the brake band 122 so that the reel structures 12 and 14 may be driven by the motor 20.

Lowering of the end 150 of the lever 144 closes the trip switch 172 in the up direction whereby the solenoid 154 is deenergized and motor 20 is energized to allow the fault sensing structure 24 to move into engagement with the film 10 on roller 58 and move the film 10 beneath the fault sensing structure 24. The brake solenoids 124 and 174 are not energized at this time and the relay 120 is not energized.

When a fault is sensed in the film 10 by any of the fault sensing fingers 62, 64, 66 or 68, the finger sensing the fault will vibrate at its predetermined designed frequency to produce an alternating signal in the coil 88 associated therewith and thus cause oscillation in the tuned circuit 116. The signal in the tuned circuit 116 drives the oscillator 108 and is amplified through the amplifier 110, detected through the detector 118 to provide a direct current signal and passed through emitter-follower 112 to bias the output power amplifier 114 so that the current passing through the amplifier 114 will energize the solenoid 120 to actuate the relay switch 176.

Actuation of the relay switch 176 energizes the brake solenoids 124 and 174. When the brake band 122 has moved into a set position, the lever 144 which is urged into contact with the brake band 122 by spring 142 when solenoid 134 is not energized is moved up at end 150 to lock the brake band 122 in a set position. Upward movement of end 150 of the lever 144 makes the lower connection of the trip switch 172 whereby the solenoid 154 is energized and the fault sensing structure is moved to an upper position out of contact with the film 10. The motor energizing circuit is broken so that the motor 20, which has previously been energized in a reverse direction on switching of the relay switch 176 due to energizing of the relay 120 to aid in the braking of the reels 12 and 14, is deenergized.

With the film inspection structure 16 stopped and the fault sensing structure 24 raised from the film 10, the film may be visually inspected to determine the fault sensed therein. When it is desired to continue automatic inspection of the film, the switch 168 is again closed to restart the cycle of operation indicated above. The reversing switch 180 is provided to permit manual switching for driving the film in a reverse direction. The contacts 181 of reversing switch 180 prevent downward movement of the fault sensing structure 24 into contact with the film 10 with the film being run in the reverse direction as a result of switch 180 being placed in its alternate position.

At any time it is desired to stop the inspection of the film, the stop pushbutton 183 may be pressed to break the circuit from the source of electric energy 170.

Figure 4:
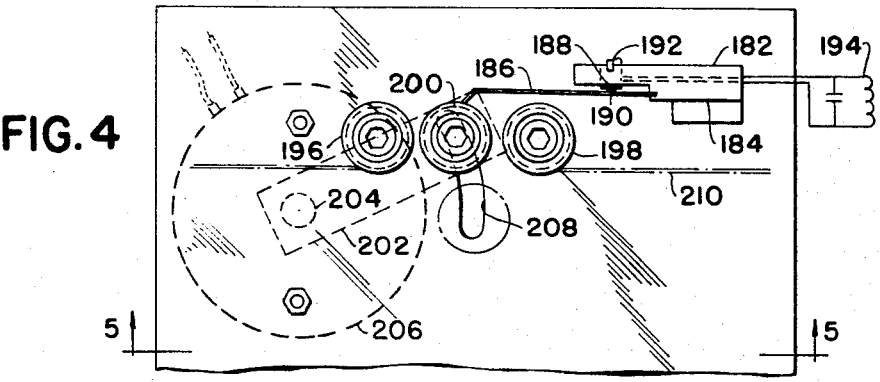
FIGURE 4 is a diagrammatic representation of a modification of the fault sensing structure illustrated in FIGURE 1.
Figure 5:
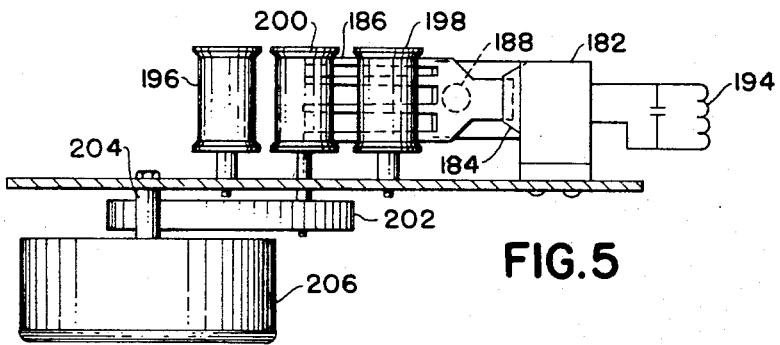
FIGURE 5 is a view of the modified fault sensing structure illustrated in FIGURE 4 taken in the direction of line 5—5 in FIGURE 4.

The modified film inspection structure illustrated in FIGURES 4 and 5 includes a similar fault sensing structure 182 having a brass mounting 184 which mounts a plurality of sensing fingers 186 adjacent a coil 188 wound on the iron core 190 which may be provided with a magnetized portion 192. Again separate tuned circuits may be provided in conjunction with the separate sensing fingers if desired, or all may be connected in parallel to a single tuned circuit 194 which may be the tuned circuit 116 of a relay actuating circuit, such as circuit 26.

The rollers 196, 198 and 200 are positioned, as shown in FIGURE 5. Roller 200 is mounted on a lever arm 202 connected for pivotal movement about the pivot mounting 204 by spring action on de-energizing the rotary solenoid 206. Roller 200 moves along the arcuate slot 208 through which it extends to engage the film 210 and place it in the configuration illustrated in FIGURE 4 as long as the rotary solenoid 206 is de-energized. The solenoid 206 is similar in use to the solenoid 154 and is de-energized when the motor 20 is energized so that the film 210 is moving between the rollers 196, 198 and 200.

The modified structure illustrated in FIGURES 4 and 5 permits straight threading of the film 210 between the rollers 196, 198 and 200 so that the film is not damaged in threading it and little dexterity is required. Also, the dashpot in conjunction with the fault sensing structure 24 may be eliminated since the film 210 prevents rapid upward movement of the roller 200 and consequent engagement with the sensing fingers 186 with a force sufficient to actuate a relay, such as relay 120, which is possible without the dashpot 156 in the structure illustrated in FIGURE 1.

While one embodiment of the present invention and modifications thereof have been considered in detail, it will be understood that other embodiments and modifications of the film inspection structure of the invention are contemplated. It is therefore the intent to include all embodiments and modifications as are defined by the appended claims within the scope of the invention.

What I claim as my invention is:

1. Structure for sensing faults in movie film or the like comprising fault sensing structure, means for relatively moving the film and fault sensing structure into contact with each other, motor means for moving the film past the fault sensing structure, signal developing structure connected to the fault sensing structure and responsive thereto for developing a signal on sensing of a fault in the film by the fault sensing structure, means responsive to the signal developing structure for stopping movement of the film past the fault sensing structure, and means responsive to the signal developing structure for relatively moving the film and fault sensing structure out of contact with each other.

2. Structure as set forth in claim 1, wherein said fault sensing structure comprises a flexible finger constructed to vibrate at a predetermined frequency on sensing of a fault in the film.

3. Structure for sensing faults in movie film or the like comprising fault sensing structure, means for relatively moving the film and fault sensing structure into contact with each other, motor means for moving the film past the fault sensing structure, signal developing structure connected to the fault sensing structure and responsive thereto for developing a signal on sensing of a fault in the film by the fault sensing structure, and means responsive to the signal developing structure for stopping movement of the film past the fault sensing structure and for relatively moving the film and fault sensing structure out of contact with each other, said fault sensing structure comprising a plurality of flexible fingers constructed to vibrate at a predetermined frequency on sensing of a fault in the film and electromagnetic means for developing an alternating electrical signal in response to vibration of one of said fingers.

4. Structure as set forth in claim 3, wherein the signal developing structure comprises an electronic circuit operably associated with the electromagnetic means and responsive to the frequency of the alternating electric signal for amplifying and detecting the alternating electric signal to provide a direct current of a magnitude to actuate a control relay.

5. Structure as set forth in claim 3, wherein the means for relatively moving the fault sensing structure and film into contact comprises a pivotally mounted member in which the sensing fingers are secured, solenoid means for pivoting the pivotally mounted member and dashpot means connected to the pivotally mounted member for controlling the movement of the fingers into contact with the film on actuation of the solenoid means.

6. Structure as set forth in claim 3, wherein the means for relatively moving the film and the fault sensing structure into contact comprises a pair of rollers positioned adjacent the fault sensing structure and a third roller positioned intermediate the said pair of rollers and a rotary solenoid connect to the third roller for moving the third roller into alignment between the pair of rollers on actuation of the rotary solenoid.

7. Structure for sensing faults in movie film or the like comprising fault sensing structure, means for relatively moving the film and fault sensing structure into contact with each other, motor means for moving the film past the fault sensing structure, signal developing structure connected to the fault sensing structure and responsive thereto for developing a signal on sensing of a fault in the film by the fault sensing structure, and means responsive to the signal developing structure for stopping movement of the film past the fault sensing structure and for relatively moving the film and fault sensing structure out of contact with each other, said means for stopping the movement of the film comprising solenoid actuated brake means responsive to the signal developing structure.

8. Structure as set forth in claim 7, wherein the means for stopping the movement of the film further includes structure for reversing the motor means responsive to the signal developing structure.

9. Structure as set forth in claim 7, wherein the means for stopping the movement of the film further includes brake locking means operable to lock the brake structure in a brake set position.

10. Structure as set forth in claim 9 and further including switch means positioned adjacent the brake locking means and operable in response to actuation of the brake locking means to turn off the motor means and move the fault sensing structure out of engagement with the film.

11. Structure for sensing faults in movie film or the like comprising fault sensing structure, means for relatively moving the film and fault sensing structure into contact with each other, motor means for moving the film past the fault sensing structure, signal developing structure connected to the fault sensing structure and responsive thereto for developing a signal on sensing of a fault in the film by the fault sensing structure, means responsive to the signal developing structure for stopping movement of the film past the fault sensing structure, and means responsive to the signal developing structure for relatively moving the film and fault sensing structure out of contact with each other, said means for stopping the movement of the film including structure for reversing the motor means responsive to the signal developing structure.

References Cited

UNITED STATES PATENTS

| 2,089,308 | 8/1937 | Sullivan | 73—159 |
| 2,612,677 | 10/1952 | Boley | 73—159 |
| 2,929,245 | 3/1960 | Fisher | 200—61.13 XR |
| 2,930,228 | 3/1960 | Lawrence et al. | 73—159 |
| 2,934,949 | 5/1960 | Grunwald | 73—157 |
| 2,936,615 | 5/1960 | Braund | 73—157 |

S. CLEMENT SWISHER, *Acting Primary Examiner.*

WILLIAM HENRY II, *Assistant Examiner.*